July 23, 1935.    J. B. HENDERSON    2,009,263
GIMBAL SYSTEM FOR GYROSCOPES
Filed Nov. 17, 1928    3 Sheets-Sheet 1
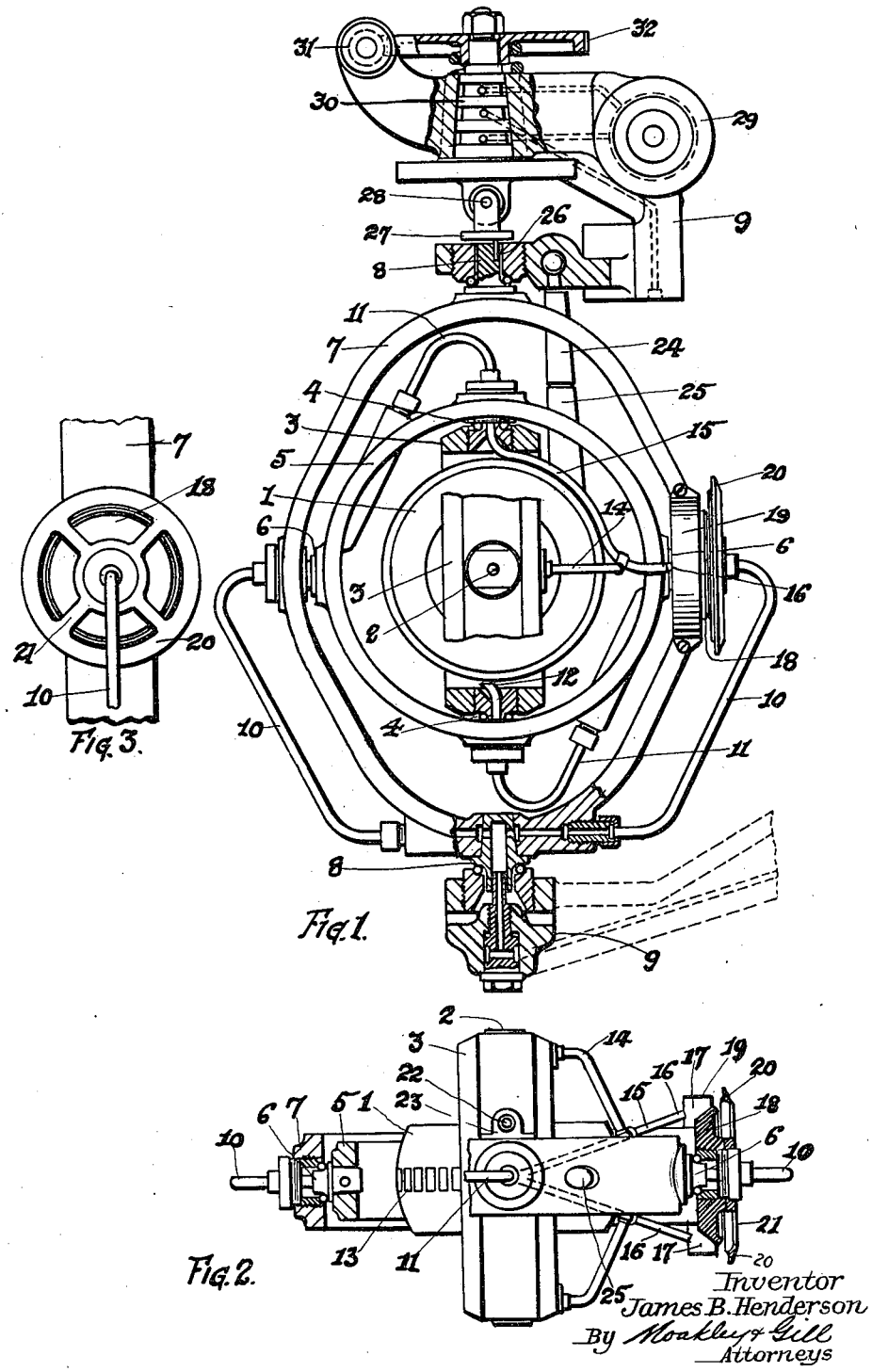
Inventor
James B. Henderson
By Moakley & Gill
Attorneys July 23, 1935.   J. B. HENDERSON   2,009,263
GIMBAL SYSTEM FOR GYROSCOPES
Filed Nov. 17, 1928   3 Sheets-Sheet 2

Inventor
James B. Henderson
By Moakley & Gill
Attorneys

July 23, 1935.　　　J. B. HENDERSON　　　2,009,263
GIMBAL SYSTEM FOR GYROSCOPES
Filed Nov. 17, 1928　　　3 Sheets-Sheet 3
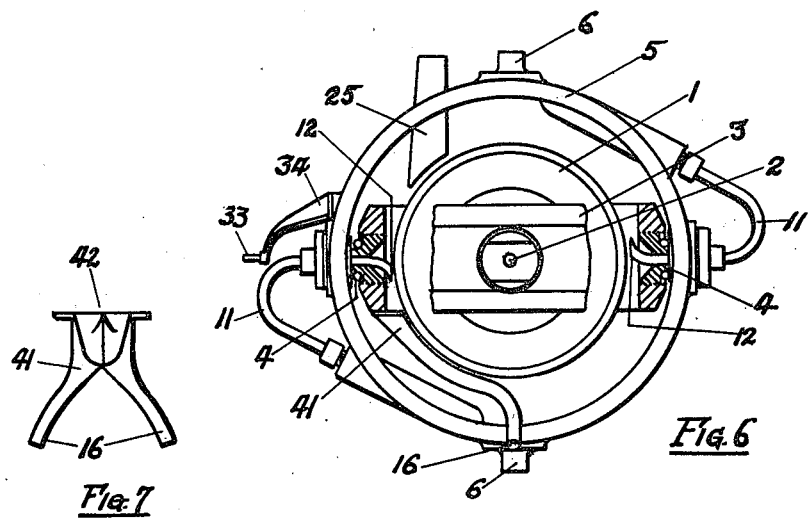
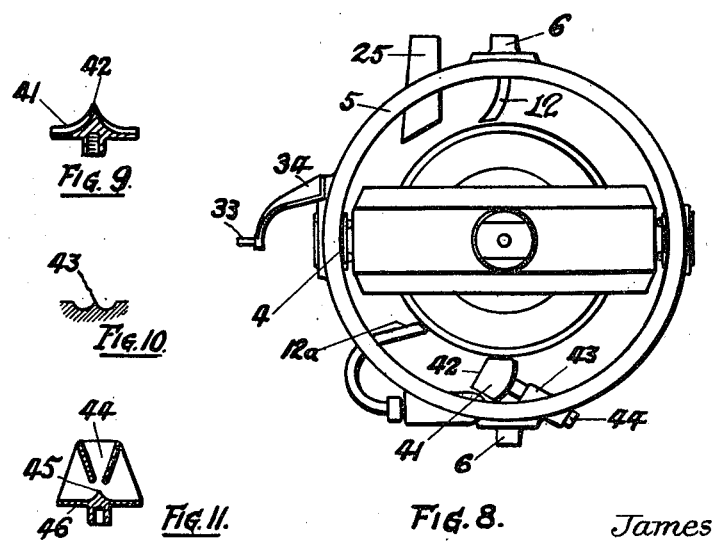
Inventor
James B. Henderson
By Moakley & Gill
Attorneys Patented July 23, 1935

2,009,263

UNITED STATES PATENT OFFICE 2,009,263

GIMBAL SYSTEM FOR GYROSCOPES

James Blacklock Henderson, Blackheath, England

Application November 17, 1928, Serial No. 320,128
In Great Britain November 25, 1927

9 Claims. (Cl. 33—204)

My invention relates to improvements in gimbal systems for gyroscopes and has for its object the elimination of certain couples tending to cause precession of the gyroscope.

In a gyroscope as ordinarily mounted so as to possess three degrees of freedom, any couple about the rotor axis due to acceleration or deceleration of the rotor, or due to a flow of angular momentum from the rotor arising from air jets or eddies, has an unbalanced component about the outer trunnion axis of the gimbals, tending to cause precession of the gyroscope about the inner gimbal trunnion axis, this component being reduced to zero only when the outer trunnion axis is exactly at right angles to the rotor axis.

In gyroscopes constructed in accordance with my present invention I eliminate this defect by causing the outer gimbal trunnion axis to remain constantly at right angles to the rotor axis. The means by which this is effected will be illustrated by a description of their application to a gyroscope of the type used for steering torpedoes, this type being particularly subject to the disturbance to which I have referred, owing to their rotors being air-driven and liable to variation of their rotational velocity during launching and during the run of the torpedo. As the most suitable arrangement will depend on the means adopted for obtaining "angle-fire", I shall describe my invention as applied to a torpedo-steering gyroscope provided with the means for obtaining "angle-fire" described in British Patent No. 234,419. It should be understood, however, that the invention is equally applicable to other types of torpedo-steering gyroscopes, and indeed to any gyroscope having three degrees of freedom.

In the accompanying drawings I have illustrated several embodiments of the invention.

Fig. 1 is a part-sectional elevation showing an arrangement of suspension of the gyroscope in which the inner gimbal trunnion axis is vertical.

Fig. 2 is a part-sectional plan of the Fig. 1 arrangement.

Fig. 3 is a side elevation of Fig. 1 showing a detail of the mechanism.

Figs. 5 to 11 show alternative constructions to some parts of Figs. 1, 2 and 4, only sufficient structure being illustrated to explain the necessary modifications.

In all the drawings corresponding parts bear the same reference numerals.

Figure 4:
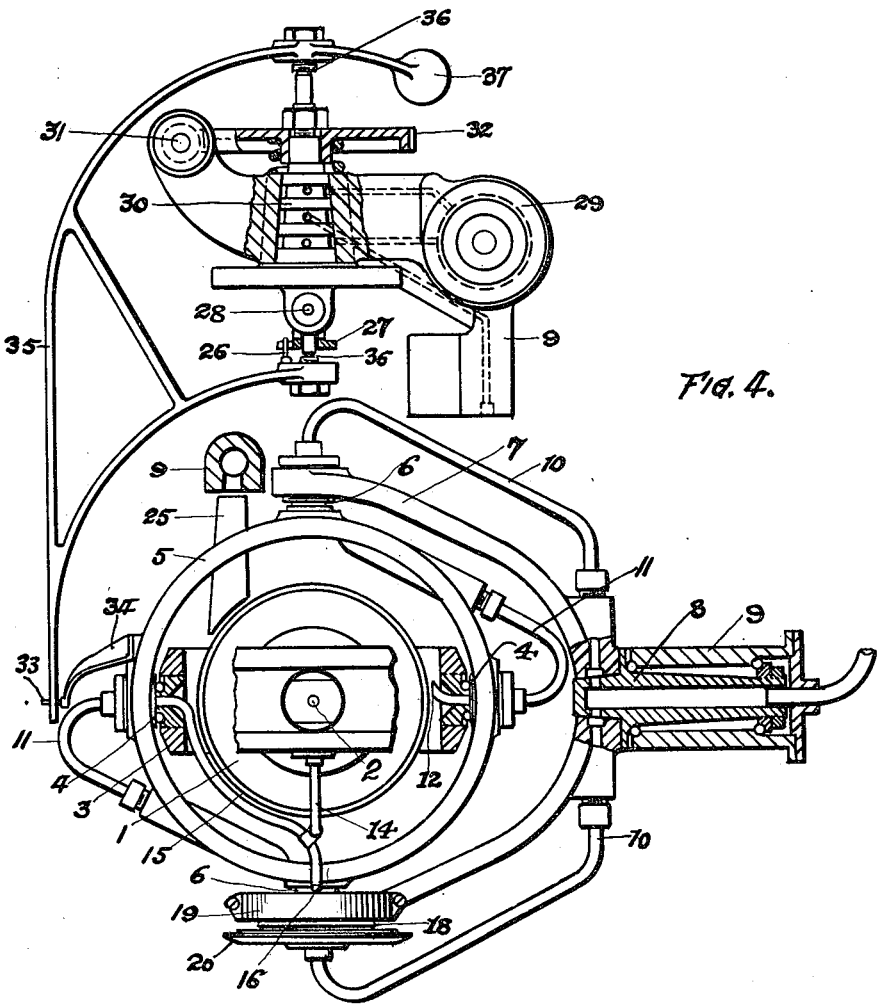
Fig. 4 is a part-sectional elevation of an arrangement in which the inner trunnion axis is horizontal.

Referring first to the arrangement shown in Figs. 1, 2 and 3, the rotor 1 is pivoted on an axis 2 in the inner gimbal ring 3, which is pivoted on trunnions 4 in the outer gimbal ring 5. The latter is pivoted on trunnions 6 in an additional gimbal ring 7 which is pivoted on trunnions 8 in the supporting frame 9 which is fixed to the shell of the torpedo. It will be realized that any unbalanced couple acting about the rotor axis 2 can have no component about the axis of the trunnions 4 and can have a component about the axis of the trunnions 6 only if that axis is not at right angles to the rotor axis 2. The introduction of the additional gimbal ring 7 permits of the trunnion axis 6 being kept at right angles to the rotor axis 2, thus suppressing any component couples tending to precess the gyroscope. This can be done automatically in a variety of ways, but the method which I prefer for use on an air-driven gyroscope is by means of air-jets.

In the method to be first described the airjets emerge from nozzles fixed to the inner gimbal ring. The compressed air supply is led in the well-known manner through the lower trunnion 8, thence through pipes 10 to the trunnions 6, and thence through pipes 11 to the trunnions 4. To the lower trunnion 4 is fixed a nozzle 12 so that the air issuing from it impinges on buckets 13 (Fig. 2) cut in the periphery of the rotor 1 and maintains its spin. To the upper trunnion 4, and to a bridge-piece 14 fixed to the inner gimbal ring 3 is fixed a Y-tube 15 terminating in two radial nozzles 16, one on either side of the gyroscope. The axes of these nozzles pass through the intersection of the trunnion axes 4 and 6 so that the reactions of the airjets issuing from the nozzles can produce no couple about either of these trunnion axes. The airjets issuing from the nozzles 16 impinge on semi-circular chutes 17 of V section (Fig. 2), constituted by the frusto-conical boss 18 on the gimbal ring 7 and the two semi-cylindrical metal bands 19 fixed to this ring. The air emerging from the chutes 17 strikes and is deflected by an annular vane 20, having the section shown in Fig. 2 and constituting the rim of the spider 21 shown in Fig. 3, fixed to the gimbal ring 7. It will be seen that except when the trunnion axis 6 is at right angles to the rotor axis 2 the reaction of the air leaving the annular vane 20 imposes a couple on the gimbal ring 7, tending to turn the ring about its trunnion axis 8 in the direction required to bring the trunnion axis 6 into a position at right angles to the rotor axis, and as the friction couple opposing this motion is small compared with the air-jet couple, there is no difficulty in maintaining the normal relative position of these axes within a few minutes of arc.

It is obvious that alternatively the air-chutes 17, or both the chutes 17 and vane 20, may be fixed to the gimbal ring 5 instead of to the ring 7, but the arrangement illustrated is considered preferable. The essential point is that they shall be virtually fixed in relation to the outer trunnion axis of the gyroscope.

In order to prevent the gimbal ring 7 from being accidentally pulled round so far that the airjets 16 no longer impinge on the chutes 17, a definite stop is provided, consisting of a pin 22 (Fig. 2) fixed to the gimbal ring 3 engaging in a clearance hole in a bracket 23 fixed to the gimbal ring 5. For spinning up the gyroscope a larger airjet from the supporting frame 9 is led to the rotor 1 by means of a chute consisting of two parts 24 and 25, the part 24 being fixed to the gimbal ring 7 and the part 25 fixed to the gimbal ring 5. In order to control the steering of the torpedo, the upper trunnion 8 has a crank pin 26 (Fig. 1) projecting upwards from it eccentric to the axis of the trunnion 8 and engaging with a slot in the stirrup piece 27 which is attached to the two ends of the piston valve 28 controlling the steering cylinder 29 through the rotatable valve casing 30. For purposes of angle-fire the valve casing 30 can be rotated by means of a worm on the spindle 31 engaging with the worm wheel 32 fixed to the valve casing 30. It is to be understood that the mechanism of this particular arrangement of valves forms no part of the present invention, being described in British Patent No. 234,419 and is here illustrated merely as representing an existing system of torpedo steering to which my invention may be applied.

Fig. 4 illustrates the case in which the inner trunnion axis of the gimbals is horizontal, the rotor 1 being pivoted on axis 2 in the inner gimbal ring 3 which is pivoted on horizontal trunnions 4 in the gimbal ring 5, and the latter in turn pivoted on vertical trunnions 6 in the fork 7 which is pivoted on the horizontal pivot 8 in the sleeve 9 which forms part of the supporting frame. The air supply is led through the pivot 8, thence by pipes 10 to the trunnions 6 and thence by the pipes 11 to the trunnions 4, to one of which the nozzle 12 for maintaining the spin of the rotor is attached, while the other supports the Y-tube 15 which is also fixed to the gimbal ring 3 by means of the bridge 14 and terminates in the two radial nozzles 16. The airjets from these nozzles impinge on chutes and on the annular vane 20, similar to those described in reference to Fig. 1, and being fixed to the fork. The effect, as in Fig. 1, is to hold the trunnion axis 6 at right angles to the rotor axis 2 and so prevent reaction couples about the axis 2 from having a component about the trunnion axis 6. The large air jet for spinning up the rotor is led from the supporting frame 9 through the chute 25 fixed to the gimbal ring 5. For operating the steering control valve 28 a pin 33 coaxial with the trunnions 4 and fixed to the gimbal ring 5 by means of the bracket 34 engages with a vertical slot in the end of the bracket 35 which is mounted on pivots 36 coaxial with the rotatable valve casing 30 and is balanced on these pivots by the counterpoise weight 37. A pin 26 fixed to the spider 35 engages in a slot on the stirrup-piece 27 attached to the piston valve 28.

Figure 5:
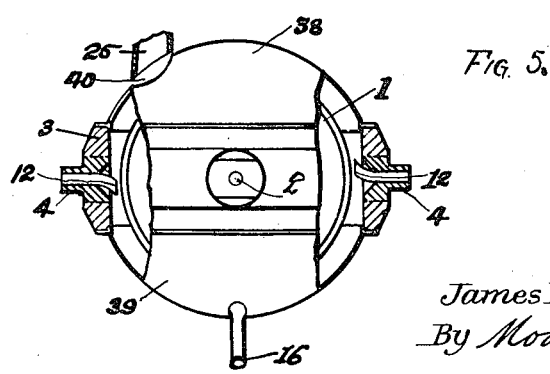

Referring now to the alternative airjet arrangement shown in Fig. 5, in this arrangement two nozzles 12, one fixed to each of the trunnions 4, may be used for maintaining the spin of the rotor 1, which is enclosed by two dome-shaped covers 38 and 39 fixed to the inner gimbal ring 3. A hole 40 in the cover 38 permits of spinning up the rotor by a large airjet through the chute 25, and two radial nozzles 16 projecting from the cover 39 provide airjets for controlling the movements of the additional gimbal ring or fork 7 (Figs. 1 and 4). Thus the air driving the rotor is maintained by the casings 38 and 39 at a certain super-atmospheric pressure, and when it leaves the casing via the jets 16 has sufficient pressure to effect the desired control of the gimbal ring or fork 7.

Alternatively the rotor may be left open and the residual velocity of the air leaving it may be utilized to provide the airjets by impulse. Such an arrangement is shown in Figs. 6 and 7. The spin of the rotor is maintained by airjets from the nozzles 12 and the air from one of these nozzles, after leaving the rotor, is caught in the double chute 41 fixed to the gimbal ring 3 and is divided by the central knife edge 42 (Fig. 7) into two equal streams which emerge from the radial nozzles 16 and control the movements of the follower ring or fork 7 by impinging on the chutes 17 and vane 20 as already described.

Since the automatic control of the follower ring or fork 7 maintains the outer gimbal ring 5 always substantially in phase with the rotor, it may not be necessary to lead the air to the jets 12 through the inner trunnions 4; it may suffice to fix the jets to the gimbal ring 5. Such an arrangement is shown in Figs. 8 and 9 in which another alternative method of controlling the follower ring 7 is also shown. The spin of the rotor 1 is maintained by air jets from the nozzles 12 and 12a, both fixed to the gimbal ring 5. The air from nozzle 12a, after leaving the rotor, impinges on the double air vane 41 (shown in section in Fig. 9) which is fixed to a boss 43 on the gimbal ring 5 by a screw 44. When the gimbal ring 5 is in phase with the rotor, the air striking the vane 41 is divided by the knife edge 42 into two equal streams which are deflected through a right angle by the curvature of the vane. The streams thus leave the vane 41 in opposite directions along a line which intersects the axis of the trunnions 6 at right angles. If, however, the ring 5 is tilted relatively to the rotor, the air from the nozzle 12a after leaving the rotor is unequally divided by the knife edge 42 and the resultant reaction of the two unequal streams leaving the vane 41 tilts the gimbal ring 5 and the follower ring 7 about the trunnion axis 8. In order that this movement of the follower ring 7 may be in the direction to keep it in phase with the rotor 1, the air buckets on the periphery of the rotor or the air vanes must be of suitable shape. For instance with the vane 41—42 shown in Fig. 9 the single peripheral row of air buckets shown in Fig. 2 is unsuitable, as such an arrangement will blow the follower ring in the wrong direction. This can be avoided by using a double row of cup-shaped buckets arranged in pairs so that the two buckets forming a pair are separated by a knife edge 43 (Fig. 10 which is a section across the rim of the rotor), as in Pelton water turbines. Alternatively a single row of buckets may be used and the air vane 41 of Fig. 9 replaced by the combined air chute and vane shown in Fig. 11. With this latter arrangement the air leaving the rotor enters the chute 44 and if the gimbal ring 5 is in phase with the rotor, the air leaving the chute is equally divided by the vane 45 into two streams and deflected in two opposite directions. If, however, the ring 5 is out of phase with the rotor, the centre of the airstream entering the chute will be displaced to one side or the other, say to the right in Fig. 11, and more air will then leave the vane 46 towards the left and less towards the right, the resultant reaction causing the gimbal ring 5 to follow the rotor and remain substantially in phase with it. With the arrangements illustrated in Figs. 8, 9, 10 and 11 the air chutes 17 and vanes 20 fixed to the follower are not required.

I have illustrated and described my invention in its particular application to torpedo steering for two reasons. Firstly the invention is intended to eliminate a fault to which air-driven gyroscopes, such as are used in torpedoes, are particularly prone, and secondly a compressed air control of the follower ring, which may be necessary or preferable on torpedoes, is uncommon and not so simple as the more usual electrical control. I have therefore paid particular attention to the actuation of the follower ring from the same supply of compressed air as drives the gyroscope, but it will be recognized that the invention is not confined to such forms as I have illustrated. Where the gyro is driven electrically it will probably be more convenient to use an electrical following mechanism for the additional ring or fork 7, and even when the gyro is air driven an electrical control of the outer trunnion axis may be preferred. Also the invention is useful in gyroscopes other than those used for torpedo steering, and where the drive is electrical the invention, by eliminating errors introduced by fluctuation of voltage, permits of much greater latitude in voltage control than is at present permissible in gyroscopic precision instruments.

I stated in the foregoing that the particular arrangement adopted for putting the invention into effect in the case of torpedo steering would depend largely on the means adopted for obtaining "angle-fire", that is, for causing the torpedo to alter its course through a predetermined angle after it has been launched. There are many different ways of obtaining this result but such methods divide themselves generally into two types, one in which the gyro, whose normal position relatively to the torpedo will be assumed to be with the rotor axis fore-and-aft, is turned from this normal position through the predetermined angle before launching and the torpedo, after being launched, then swings round through this angle so that the gyro thereafter occupies its "normal" position relatively to the torpedo. In the other type the torpedo is launched with the gyro in its "normal" position but with the steering valve turned through the predetermined angle and, after launching, the torpedo turns in azimuth so as to recenter the valve, thereby turning relatively to the gyro so that the average position of the gyro during the remainder of the run is one in which the rotor axis is deflected from the fore-and-aft line of the torpedo by the angle through which the course of the torpedo has altered. So far as my invention is concerned it is immaterial which of these two general methods is used as the mechanism shown herein lends itself to either method, the only difference being that in the first case, with the mechanism of Fig. 4, the axis round which the moving element 7 is controlled is substantially collinear with the average position of the inner gimbal trunnions during the run and after the turn, while in the other case the gyro is launched in this position and after the turn the axis round which the element 7 is controlled is substantially inclined to the inner gimbal trunnions. With the mechanism of Fig. 1 on the other hand I use the element 7 to control the steering valve and the axis round which this element is controlled remains normally collinear with the average position of the inner gimbal trunnions no matter which method of "angle-fire" is used. Structurally the main difference between the two methods is that if the gyro is given a preliminary deflection relatively to the torpedo, rather than turning the valve, the mechanism must allow of the starting nozzle 24, if used, being deflected in phase with the gyro during the launching period.

I claim:—

1. A gyroscopic system comprising a gyroscope mounted in gimbals with three degrees of freedom on rotor trunnions, inner gimbal trunnions and outer gimbal trunnions respectively, said inner gimbal trunnions being substantially at right angles to both the rotor trunnions and outer gimbal trunnions and the outer gimbal trunnions lying normally in the plane of rotation of the gyroscope, a base support, a movable member pivoted on the base support and pivotally supporting the outer gimbal trunnions, and means responsive to departure of the outer gimbal trunnions from the said plane of rotation whereby the movable member is moved pivotally in relation to the base support in the direction to restore the outer gimbal trunnions to the said plane of rotation.

2. A gyroscopic system comprising a gyroscope mounted in gimbals with three degrees of freedom on rotor trunnions, inner gimbal trunnions and outer gimbal trunnions respectively, said rotor trunnions being at right angles to the inner gimbal trunnions and normally at right angles to the outer gimbal trunnions, a base support, a movable member pivotally supporting the outer gimbal trunnions and pivoted on the base support on trunnions normally coaxial with the inner gimbal trunnions, and means responsive to relative movements between the rotor trunnions and outer gimbal trunnions about the axis of the inner gimbal trunnions whereby the movable member may be moved relatively to the base support in the same direction as the rotor trunnions so as to keep the outer gimbal trunnions at right angles to the rotor trunnions.

3. A gyroscopic system comprising a gyroscope mounted in gimbals with three degrees of freedom on rotor trunnions, inner gimbal trunnions and outer gimbal trunnions respectively, the gyroscope being arranged to rotate in a plane containing the inner gimbal trunnions and normally containing the outer gimbal trunnions, a base support, a movable member pivotally supporting the outer gimbal trunnions and pivoted on the base support, and means carried by the gyroscope and movable member and responsive to departure of the outer gimbal trunnions and movable member from the plane of rotation of the gyroscope whereby the movable member is pivotally moved relatively to the base support to restore the outer gimbal trunnions to the said plane of rotation.

4. A gyroscopic system comprising a gyroscope mounted in gimbals with three degrees of freedom on rotor trunnions, inner gimbal trunnions and outer gimbal trunnions respectively, said inner gimbal trunnions being substantially at right angles both to the rotor trunnions and the outer gimbal trunnions, a base support, a movable member pivotally supporting the outer gimbal trunnions and pivoted on the base support, means whereby the gyroscope may be rotated about the axis of the rotor trunnions including a compressed air duct terminating in a nozzle, and means whereby the outer gimbal trunnions may be maintained substantially at right angles to the rotor trunnions including a second air line and nozzle fixed relatively to the axis of the rotor trunnions and means on the movable member fixed relatively to the axis of one of the outer gimbal trunnions and operable by the air discharged from the last said air line and nozzles.

5. A gyroscopic system comprising a gyroscope mounted in gimbals with three degrees of freedom on rotor trunnions, inner gimbal trunnions and outer gimbal trunnions respectively, said inner gimbal trunnions being at right angles both to the rotor trunnions and outer gimbal trunnions, a base support, a movable member pivotally supporting the outer gimbal trunnions and pivoted on the base support, means whereby the gyroscope may be rotated including a compressed air duct terminating in a nozzle, and means whereby the movable member may be moved relatively to the base support so as to keep the outer gimbal trunnions substantially at right angles to the rotor trunnions, last said means including a plurality of compressed air ducts terminating in nozzles fixed relatively to the axis of the rotor trunnions and a like number of chutes associated with the movable member and positioned so as to receive the air discharged from the last said nozzles.

6. A gyroscopic system comprising a gyroscope mounted in gimbals with three degrees of freedom on rotor trunnions, inner gimbal trunnions and outer gimbal trunnions respectively, said inner gimbal trunions being substantially at right angles both to the rotor trunnions and outer gimbal trunnions, a base support, a movable member pivotally supporting the outer gimbal trunnions and pivoted on the base support, and mechanism whereby the gyroscope may be rotated and the outer gimbal trunnions may be kept substantially at right angles to the rotor trunnions, said mechaism including a compressed air duct terminating in a nozzle arranged to project a jet of air tangentially against the periphery of the gyroscope and means fixed relatively to the axis of one of the outer gimbal trunnions operable by the air discharged from said nozzle after the said air has come in contact with the gyroscope.

7. A gyroscopic system comprising a gyroscope mounted in gimbals with three degrees of freedom on rotor trunnions, inner gimbal trunnions and outer gimbal trunnions respectively, a base support, a movable member pivotally supporting the outer gimbal trunnions and movable relatively to the base support about a pivot axis substantially collinear with the normal position of the inner gimbal trunnions, and a follow-up device on gyroscope and movable member actuated by movements of the rotor trunnions relatively to the outer gimbal trunnions about the axis of the inner gimbal trunnions and acting on the movable member about said pivot axis so as to maintain the outer gimbal trunnions substantially at right angles to the rotor trunnions.

8. A gyroscopic system comprising a gyroscope mounted in gimbals with three degrees of freedom on rotor trunnions, inner gimbal trunnions and outer trunnions respectively, a base support, a movable member pivotally supporting said outer gimbal trunnions and pivoted on the base support on a pivot axis substantially collinear with the normal position of the inner gimbal trunnions, and a follow-up device having a part fixed relatively to the axis of the rotor trunnions and a part fixed relatively to the axis of the outer gimbal trunnions and actuated by movements of the rotor trunnions relatively to the outer gimbal trunnions about the axis of the inner gimbal trunnions and adapted to maintain the outer gimbal trunnions substantially at right angles to the rotor trunnions.

9. A gyroscopic system comprising a gyroscope mounted in gimbals with three degrees of freedom about the axes of rotor trunnions, inner gimbal trunnions and outer gimbal trunnions respectively, said trunnions being substantially at right angles to each other, a base support, a movable member pivotally supporting the outer gimbal trunnions and pivoted on the base support about a pivot axis substantially collinear with the normal position of the inner gimbal trunnions, and follow-up means on the gyroscope and movable member and responsive to angular displacements between the gyroscope and movable member about the axis of the inner gimbal trunnions whereby the movable member is moved about said pivot axis in accordance with said relative movements of the gyroscope and movable member and in the same direction so as to keep the outer gimbal trunnions always at right angles to the rotor trunnions whereby any torque acting on the gyroscope about the rotor trunnion axis can have no component about the axis of the outer gimbal trunnions.

JAMES BLACKLOCK HENDERSON.